United States Patent
Zhou et al.

(10) Patent No.: US 9,629,121 B2
(45) Date of Patent: Apr. 18, 2017

(54) NETWORK ACCESS METHOD AND APPARATUS

(71) Applicant: Samsung Electronics Co., Ltd., Suwon-si, Gyeonggi-do (KR)

(72) Inventors: Lei Zhou, Beijing (CN); Hai Wang, Beijing (CN); Xufeng Zheng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/600,720

(22) Filed: Jan. 20, 2015

(65) Prior Publication Data

US 2015/0131597 A1 May 14, 2015

Related U.S. Application Data

(63) Continuation of application No. 13/464,360, filed on May 4, 2012.

(30) Foreign Application Priority Data

| May 5, 2011 | (CN) | .......................... 2011 1 0124570 |
| Jan. 6, 2012 | (CN) | .......................... 2012 1 0004042 |

(51) Int. Cl.
*H04L 1/00* (2006.01)
*H04W 72/02* (2009.01)
(Continued)

(52) U.S. Cl.
CPC ........... *H04W 72/02* (2013.01); *H04W 4/005* (2013.01); *H04W 48/08* (2013.01); *H04W 72/048* (2013.01); *H04W 88/08* (2013.01)

(58) Field of Classification Search
CPC . H04L 47/10; H04L 2012/5631; H04L 47/15; H04L 47/2441; H04L 47/70;
(Continued)

(56) References Cited

U.S. PATENT DOCUMENTS

| 7,376,100 B2 | 5/2008 | Chang |
| 7,894,371 B2 | 2/2011 | Bonta et al. |

(Continued)

FOREIGN PATENT DOCUMENTS

| KR | 10-2007-0080735 A | 8/2007 |
| KR | 10-2008-0039616 A | 5/2008 |
| KR | 10-2009-0034356 A | 4/2009 |

OTHER PUBLICATIONS

Wang et al., Proposed Text for Network Reentry for a Large Number of M2M Devices, Mar. 8, 2011, IEEE S802.16p-11_0008.
(Continued)

*Primary Examiner* — Brenda H Pham
(74) *Attorney, Agent, or Firm* — Jefferson IP Law, LLP (57) ABSTRACT

A network access method and an apparatus are provided. The Machine to Machine (M2M) terminal in one M2M terminal group determines an access resource according to an identifier of the M2M terminal group which the M2M terminal is a member of, and The M2M terminal of the M2M terminal group uses the determined access resource to conduct network access on behalf of the M2M terminal group. The method and apparatus can ensure that numerous M2M terminals can successfully access the network at the same time.

28 Claims, 4 Drawing Sheets

(51) Int. Cl.
    *H04W 4/00*        (2009.01)
    *H04W 48/08*      (2009.01)
    *H04W 72/04*      (2009.01)
    *H04W 88/08*      (2009.01)

(58) Field of Classification Search
    CPC .......... H04L 2012/5608; H04W 84/12; H04W 88/08; H04W 80/04; H04W 88/06; H04W 84/18
    USPC .............................. 370/230, 310.2, 328, 338
    See application file for complete search history.

(56) References Cited

U.S. PATENT DOCUMENTS

| | | | |
|---|---|---|---|
| 8,458,266 B2 | 6/2013 | Jeong et al. | |
| 8,559,610 B2 | 10/2013 | Crockett et al. | |
| 9,119,176 B2 * | 8/2015 | Zhou | H04W 72/02 |
| 2007/0206561 A1 | 9/2007 | Son et al. | |
| 2008/0025337 A1 | 1/2008 | Smith et al. | |
| 2008/0101269 A1 | 5/2008 | Jung et al. | |
| 2011/0053619 A1 | 3/2011 | Shaheen et al. | |
| 2011/0268006 A1 | 11/2011 | Koskela et al. | |
| 2012/0129540 A1 * | 5/2012 | Hakola | H04W 72/042 455/450 |
| 2013/0265984 A1 * | 10/2013 | Li | H04B 7/2656 370/330 |

OTHER PUBLICATIONS

Zhou et al, Proposed Text for network access entry for a large No. of M2M devices, IEEE C802.16p-11/0008, Mar. 6, 2011.

\* cited by examiner

FIG.1

| PARTITION INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| NUMBER OF THE INITIAL RP CODES, $N_{IN}$ | 8 | 8 | 8 | 8 | 16 | 16 | 16 | 16 | 24 | 24 | 24 | 24 | 32 | 32 | 32 | 32 |
| NUMBER OF THE HANDOVER RP $N_{HO}$ | 8 | 16 | 24 | 32 | 8 | 16 | 24 | 32 | 8 | 16 | 24 | 32 | 8 | 16 | 24 | 32 |
| NUMBER OF THE M2M GROUP CODES $N_{M2M\ group}$ | 8 | 8 | 8 | 8 | 16 | 16 | 16 | 16 | 24 | 24 | 24 | 24 | 32 | 32 | 32 | 32 |

FIG.2

| SYNTAX | SIZE (BIT) | NOTES |
|---|---|---|
| ... | ... | ... |
| MULTIPLEXING FACTOR OF DEDICATED RANGING CODE | 3 | INDICATE MULTIPLEXING RATIO OF DEDICATED RANGING CODE<br>0b000:1<br>0b001:1/2<br>0b010:1/4<br>0b011:1/8<br>0b100:1/16<br>0b101:1/32<br>0b110:1/64<br>0b111:1/128 |
| ... | ... | ... |

FIG.3

| NAME | TYPE (1 BYTE) | LENGTH | VALUE |
|---|---|---|---|
| START OF RANGING CODES GROUP | 155 | 1 | INDICATES THE STARTING NUMBER, S, OF THE GROUP OF CODES USED FOR THIS UL. IF NOT SPECIFIED, THE DEFAULT VALUE SHALL BE SET TO ZERO. ALL THE RANGING CODES USED ON THIS UL SHALL BE BETWEEN S AND $((S+O+N+M+L+K+J+I+H+G+F+N_{M2M\,group})$ mod 256) WHERE N IS THE NUMBER OF INITIAL RANGING CODES M IS THE NUMBER OF PERIODIC RANGING CODES L IS THE NUMBER OF BR CODES O IS THE NUMBER OF HO RANGING CODES K IS THE NUMBER OF INITIAL RANGING CODES IN INITIAL RANGING CODE SET 1 J IS THE NUMBER OF BR RANGING CODES IN BR RANGING CODE SET 1 I IS THE NUMBER OF HO RANGING CODES IN HO RANGING CODE SET 1 H IS THE NUMBER OF HO RANGING CODES IN HO RANGING CODE SET 2 G IS THE NUMBER OF RS INITIAL RANGING CODES F IS THE NUMBER OF RS DEDICATED CODES $N_{M2M\,group}$ IS THE NUMBER OF M2M GROUP DEDICATED CODES THE RANGE OF VALUES IS $0 \leq S \leq 255$. |
| DEDICATED CODES SET FOR M2M GROUP | 225 | 1 | NUMBER OF DEDICATED CODES FOR M2M GROUP. POSSIBLE VALUES ARE 0.~255. DEFAULT VALUE IS 0 |

FIG.4

| FIELD | SIZE (BITS) | VALUE/DESCRIPTION |
|---|---|---|
| CONFIGURATION OF M2M RANGING FOR NS-RCH | 2 | 0B00: $(O_{SF}+2)^{th}$ UL AAI SUBFRAME IN EVERY FRAME<br>0B01: $(O_{SF}+1)^{th}$ UL AAI SUBFRAMES IN THE THIRD FRAME IN EVERY SUPERFRAME<br>0B10: $(O_{SF}+1)^{th}$ UL AAI SUBFRAMES IN THE THIRD FRAME IN IN EVERY EVEN NUMBERED SUPERFRAME, I.E., MOD(SUPERFRAME NUMBER, 2) = 0<br>0B11: $(O_{SF}+1)^{th}$ UL AAI SUBFRAMES IN THE THIRD FRAME IN EVERY 4TH SUPERFRAME, I.E., MOD(SUPERFRAME NUMBER, 4) = 0 |
| CONFIGURATION OF M2M RANGING FOR S-RCH | 2 | 0B00: $(O_{SF}+3)^{th}$ UL AAI SUBFRAME IN EVERY FRAME<br>0B01: $(O_{SF}+1)^{th}$ UL AAI SUBFRAMES IN THE FOURTH FRAME IN EVERY SUPERFRAME<br>0B10: $(O_{SF}+1)^{th}$ UL AAI SUBFRAMES IN THE FOURTH FRAME IN IN EVERY 4TH SUPERFRAME, I.E., MOD(SUPERFRAME NUMBER, 4) = 0<br>0B11: $(O_{SF}+1)^{th}$ UL AAI SUBFRAMES IN THE FOURTH FRAME IN EVERY 8TH SUPERFRAME, I.E., MOD(SUPERFRAME NUMBER, 8) = 0 |

NETWORK ACCESS METHOD AND APPARATUS

PRIORITY

This application is a continuation application of a prior application Ser. No. 13/464,360, filed on May 4, 2012, which claimed the benefit under 35 U.S.C. §119(a) of a Chinese patent application filed in the State Intellectual Property Office of the People's Republic of China on May 5, 2011 and assigned Serial number 201110124570.8, and of a Chinese patent application filed in the State Intellectual Property Office of the People's Republic of China on Jan. 6, 2012 and assigned Serial number 201210004042.3, the entire disclosure of each of which is hereby incorporated by reference.

BACKGROUND OF THE INVENTION

1. Field of the Invention

The present application relates to a mobile communication technical field. More particularly, the present invention relates to a network access method and apparatus.

2. Description of the Related Art

Internet technology, such as Machine to Machine (M2M) communications, can ensure that equipment is able to establish wireless connections between systems, between remote devices, and between individuals in real time, and provides for the transmission of data. The M2M technology combines data collection, Global Positioning System (GPS) information, remote control processes, as well as telecommunications and information technology, and is a system of computers, networks, devices, sensors, and so on, that can enable business process automation and integrate real-time status of a company's information technology systems and non-Information Technology (IT) equipment to create value-added services.

In application, the M2M technology is only for public network services, i.e., human-computer interaction communications or human interaction communication. However, because there are many M2M services, the number of referred M2M terminals is very large. For example, each cell in a cellular communication network may support tens of thousands, even hundreds of thousands of M2M terminals. Thus, when such a large number of M2M terminals access the cellular communication network at the same time, it will cause network access congestion, and a base station supporting the cellular communication network can not accommodate simultaneous access of such a large number of M2M terminals.

Accordingly, there is a need for a network access method and apparatus that can ensure that numerous M2M terminals can successfully access the network at the same time.

SUMMARY OF THE INVENTION

Aspects of the present invention are to address at least the above-mentioned problems and/or disadvantages and to provide at least the advantages described below. Accordingly, an aspect of the present invention is to provide a network access method and apparatus, which can ensure that numerous Machine to Machine (M2M) terminals can successfully access the network at the same time.

In accordance with an aspect of the present invention, a network access method is provided. The method includes determining, by an M2M terminal in one M2M terminal group, an access resource according to an identifier of the M2M terminal group of which the M2M terminal is a member, and conducting, by the M2M terminal of the M2M terminal group, network access on behalf of the M2M terminal group using the determined access resource.

In accordance with an aspect of the present invention, a method for supporting network access of a Machine to Machine (M2M) terminal is provided. The method includes sensing, by a base station, network access using an access resource from an M2M terminal in one M2M terminal group, on behalf of the M2M terminal group, sending feedback to the M2M terminal, and scheduling M2M terminals of the M2M terminal group in units of M2M terminal groups. Wherein the access resource is determined according to an identifier of an M2M terminal group of which the M2M terminal is a member.

In accordance with an aspect of the present invention, an apparatus of a Machine to Machine (M2M) terminal conducting network access is provided. The apparatus includes a controller for determining an access resource according to an identifier of an M2M terminal group of which the M2M terminal is a member, and a transceiver for conducting network access on behalf of the M2M terminal group using the determining access resource.

In accordance with an aspect of the present invention, an apparatus of a base station for supporting network access of a Machine to Machine (M2M) terminal is provided. The apparatus includes a transceiver for sensing network access using an access resource from an M2M terminal in one M2M terminal group, on behalf of the M2M terminal group, and a controller for sending feedback to the M2M terminal, and scheduling M2M terminals of the M2M terminal group in units of M2M terminal groups. Wherein the access resource is determined according to an identifier of an M2M terminal group of which the M2M terminal is a member.

According to an exemplary implementation, each M2M terminal in the M2M terminal group determines the access resource according to the identifier of the M2M terminal group of which the M2M terminal is a member, and at least one M2M terminal of the M2M terminal group uses the determined access resource to conduct network access on behalf of the M2M terminal group. In an exemplary implementation, the M2M terminal takes the M2M terminal group as a unit to determine the access resource on the whole (i.e., to determine the access resource of the M2M terminal group) and at least one M2M terminal of the M2M terminal group uses the determined access resource to conduct network access on behalf of the M2M terminal group. Accordingly, all M2M terminals do not need to conduct network access individually, which can ensure that numerous M2M terminals can successfully access the network at the same time and avoid network access congestion.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to make objects, technical solutions and advantages of the present invention clear, exemplary embodiments of the present invention are hereinafter further explained with reference to the drawings.

Figure 1:
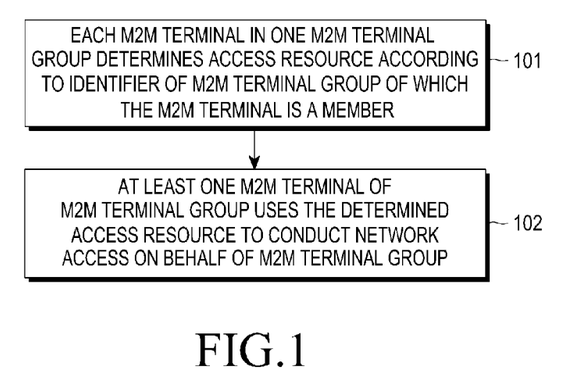
FIG. 1 is a flowchart of a network access procedure according to an exemplary embodiment of the present invention.

FIG. 1 is a flowchart of a network access procedure according to an exemplary embodiment of the present invention.

Referring to FIG. 1, Machine to Machine (M2M) terminals in the network can be divided into a plurality of M2M terminal groups, and each M2M terminal group has a unique identifier in the network.

The M2M terminal groups can be formed in a way that the network divides all the M2M terminals in the network into a plurality of M2M terminal groups according to a predetermined principle (i.e., M2M terminals having the same or similar properties such as close geographical position, similar applications, and so on, are in the same M2M terminal group). The numbers of M2M terminals contained in different M2M groups can be the same or different.

In addition, the aforementioned network can be an entire network, or a network of at least one district, which can be defined according to actual needs.

Based on the aforementioned divided M2M terminal groups, and with reference to FIG. 1, an exemplary flow of the network access procedure is provided below.

In step 101, each M2M terminal in one M2M terminal group determines an access resource according to the identifier of the M2M terminal group of which the M2M terminal is a member.

For network access by the M2M terminals, a key consideration is uplink ranging or uplink access. The uplink ranging or uplink access mainly includes resources such as uplink access codes (e.g., allocation of orthogonal sequences) and an access channel (e.g., allocation of frequency resources in the uplink). Accordingly, the M2M terminal may determine the access resource according to the identifier of the M2M terminal group of which the M2M terminal is a member by determining an uplink access code and an access channel according to the identifier of the M2M terminal group of which the M2M terminal is a member.

In step 102, at least one M2M terminal of the M2M terminal group uses the determined access resource to conduct network access on behalf of the M2M terminal group.

After step 102, the process shown in FIG. 1 is completed.

The following will describe an exemplary method by which the M2M terminal respectively determines the uplink access code and the access channel according to the identifier of the M2M terminal group of which the M2M terminal is a member.

Uplink Access Codes

Figure 2:
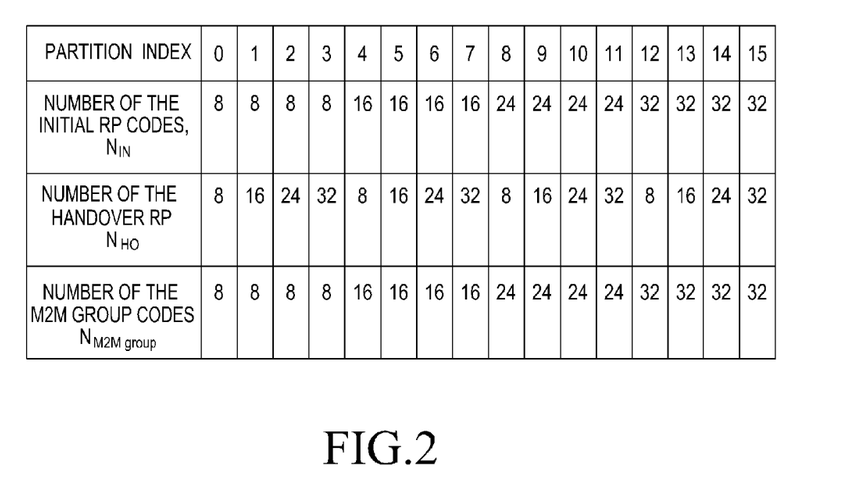
FIG. 2 shows a determination of a number of uplink access codes according to an exemplary embodiment of the present invention.

FIG. 2 shows a determination of a number of uplink access codes according to an exemplary embodiment of the present invention.

In an exemplary implementation, for each M2M terminal group, the uplink access code belonging to the M2M terminal group in the access channel may be determined. A determining method can be implemented through step A1, which is described below.

In step A1, the M2M terminal obtains a multiplexing factor of the M2M terminal group of which the M2M terminal is a member from a base station that supports the M2M terminal The M2M terminal determines the uplink access code according to the identifier of the M2M terminal group of which the M2M terminal is a member, a total number of uplink access codes allocated to the M2M terminal group of which the M2M terminal is a member, a total number of identifiers of all the M2M terminal groups in the network, and the obtained multiplexing factor.

In an exemplary implementation, step A1 can be implemented through the following formula 1:

$$r = \mathrm{mod}(\mathrm{floor}(MGID/M), N_{M2Mgroup}) \quad \text{(formula 1)}$$

In formula 1, r represents an identifier of an uplink access code, mod( ) represents complementation (e.g., a modulo operation), floor( ) represents a round down operation (e.g., floor (2.3)=2 or floor(2.6)=2), MGID represents an identifier of the M2M terminal group of which the M2M terminal is a member, and M represents a needed time domain resource. M can be represented with the following formula 2:

$$M = \lfloor MGID_{total} \times \alpha / N_{M2Mgroup} \rfloor \quad \text{(formula 2)}$$

wherein, $MGID_{total}$ represents a total number of identifiers of M2M terminal groups in the network. $N_{M2Mgroup}$ represents a total number of uplink access codes allocated to the M2M terminal group of which the M2M terminal is a member. $N_{M2Mgroup}$ can be obtained by the M2M terminal sensing regular broadcasts of the base station. For example, the M2M terminal may obtain a configuration serial number from a list of serial numbers from 0 to 15 as shown in FIG. 2, and obtain a corresponding $N_{M2Mgroup}$ from the configuration information table. The configuration information table further defines configurations including the number of the initial Ranging Preamble (RP) codes $N_{IN}$, the number of the handover RP codes $N_{HO}$, and the number of the M2M Group codes $N_{M2M\ group}$ according to the obtained configuration serial number.

α represents a multiplexing factor of the M2M terminal group of which the M2M terminal is a member, and is used to indicate how many M2M terminal groups will multiplex the same access resource. The value of a can be 1, ½, ¼, ⅛, ¹⁄₁₆, ¹⁄₃₂, ¹⁄₆₄, ¹⁄₁₂₈, . . . and so on. When the value of α is 1, it represents that all the M2M terminal groups will not multiplex the access resource, i.e., each M2M terminal group has a different access resource. When the value of α is ½ (or other values such as ¼, ⅛, ¹⁄₁₆, ¹⁄₃₂, ¹⁄₆₄, ¹⁄₁₂₈, the status is similar), it represents that two M2M terminal groups will multiplex the same access resource.

It should be noted that the multiplexing factor of the M2M terminal group of which the M2M terminal is a member can also be configured as a fixed value or be bilaterally agreed upon by the M2M terminal and the base station and so on. Accordingly, the M2M terminal can omit the process of obtaining the multiplexing factor of the M2M terminal group of which the M2M terminal is a member from the base station, and the multiplexing factor of the M2M terminal group of which the M2M terminal is a member can be obtained directly according to the configuration or the agreement.

In addition, as an extension of the above described exemplary embodiment, the aforementioned uplink access code can also be determined according to the following step A2

In step A2, the M2M terminal determines the uplink access code according to the identifier of the M2M terminal group of which the M2M terminal is a member and a total number of uplink access codes allocated to the M2M terminal group of which the M2M terminal is a member.

An implementation of step A2 can be performed using the following formula 3:

$$r = \mod(MGID \times \alpha', N_{M2Mgroup}) \quad \text{(formula 3)}$$

wherein, r represents an identifier of the uplink access code. α' is a setup parameter value and its value can be 1, a multiplexing factor of the M2M terminal group of which the M2M terminal is a member, or other values, and is not limited in the present invention. The following will describe an exemplary determination of the access channel.

Access Channel

Because there are many M2M services, the number of referred M2M terminals is relatively large, as is the number of M2M terminal groups. In view of this situation, exemplary embodiments of the present invention can determine how many superframes are needed to carry the access of the M2M terminal group according to the number of uplink access codes allocated to the M2M terminal group and the number of the M2M terminal groups in the network, and can use the multiplexing factor of the M2M terminal group to control the multiplex status of the M2M terminal group at the same time to reduce a delay.

In an exemplary embodiment, the present invention can use the following steps to determine the access channel.

In step B1, the M2M terminal obtains the multiplexing factor of the M2M terminal group of which the M2M terminal is a member from the base station.

It should be noted that the multiplexing factor of step B1 can also be configured as a fixed value or be bilaterally agreed upon by the M2M terminal and the base station, and so on. Accordingly, the M2M terminal can omit the process of obtaining the multiplexing factor of the M2M terminal group of which the M2M terminal is a member from the base station (i.e., step B1 can be omitted) and the multiplexing factor of the M2M terminal group of which the M2M terminal is a member can be obtained directly according to the configuration or the agreement.

In step B2, the M2M terminal determines the access channel according to the identifier of the M2M terminal group of which the M2M terminal is a member, the total number of the uplink access codes allocated to the M2M terminal group of which the M2M terminal is a member, the total number of identifiers of all the M2M terminal groups in the network, and the obtained multiplexing factor.

Step B2 can be implemented through the following formula 4:

$$\mod(MGID, M) - \mod(C, M) = 0 \quad \text{(formula 4)}$$

wherein C represents an identifier (or number) of a frame or a superframe in which the access channel is located.

In wireless communication systems, one superframe contains four frames, and whether each frame contains an access channel depends on the network configuration. In order to explain exemplary embodiments of the present invention more clearly, four configuration situations are given below as examples.

In a first situation, each of the four frames of each superframe contains one access channel. Based on this situation, according to formula 3, it can be specifically obtained:

C=4*superframe number+i, wherein i is a frame identifier and its value can be 0, 1, 2 or 3.

In a second situation, one frame of each superframe contains one access channel. According to formula 3, it can be specifically obtained:

C=superframe number.

In a third situation, one frame of even numbered superframes, which meet the criteria of mod(superframe number, 2)=0 in every two superframes, contains one access channel. According to formula 3, it can be specifically obtained:

C=superframe number/2.

In a fourth situation, one frame of superframes, which meet the criteria of mod(superframe 4)=0 in every four superframes, contains one access channel. According to formula 3, it can be specifically obtained:

C=superframe number/4.

It should be noted that formula 4 is only one exemplary means of determining the access channel. As an extension of the illustrated example, the access channel can also be determined using other formulas, two kinds of which are listed below. That is, the aforementioned formula 4 can also be replaced as:

$$\mod(MGID \times \alpha'/N_{M2Mgroup}, M)\mod(C-1, M) = 0 \quad \text{(formula 5)}$$

wherein, α' is a setup parameter value, and its value can be 1, a multiplexing factor of the M2M terminal group of which the M2M terminal is a member, or other values, and is not limited in the present invention.

In summary, it can be seen that the formulas for determining the access channel are only examples by which the M2M terminal may determine the access channel according to the identifier of the M2M terminal group of which the M2M terminal is a member, the total number of uplink access codes allocated to the M2M terminal group of which the M2M terminal is a member, the total number of identifiers of all the M2M terminal groups in the network, and the obtained multiplexing factor, and should not be construed as limiting the present invention.

After determining the access channel, for an access period of the M2M terminal group, exemplary embodiments of the present invention can further determine a starting point of the access channel in the access period, which can be specifically implemented through the following formula 6. The access period of the M2M terminal group can be changeable. Moreover, the access period denotes a period of the total number of the superframes that can accommodate the entire time domain resource M. In one access period, $N_{M2Mgroup}$ and α should remain unchanged.

$$\mod(N_{superframe\ number}, M/k)=0 \qquad \text{(formula 6)}$$

$N_{superframe\ number}$ is an identifier of a frame or a superframe that includes the access channel (i.e., a starting point in the access period). k represents a number factor of the access channels contained in one superframe. For example, when the value of k is 4, it represents that one superframe contains four access channels. When the value of k is 1, it represents that one superframe contains one access channel. When the value of k is ½, it represents that two superframes contain one access channel. And when the value of k is ¼, it represents that four superframes contain one access channel.

The above provides an exemplary method of determining the uplink access code and the access channel.

It should be noted that the aforementioned multiplexing factor of the M2M terminal group can be sent through a cell format of a Secondary Super Frame Header Sub-Packet 1 (S-SFH SP1) of an Institute of Electrical and Electronics Engineers (IEEE) 802.16 series communications system. Certain details of information related to the multiplexing factor of a dedicated ranging code are shown in FIG. 3.

Figure 3:
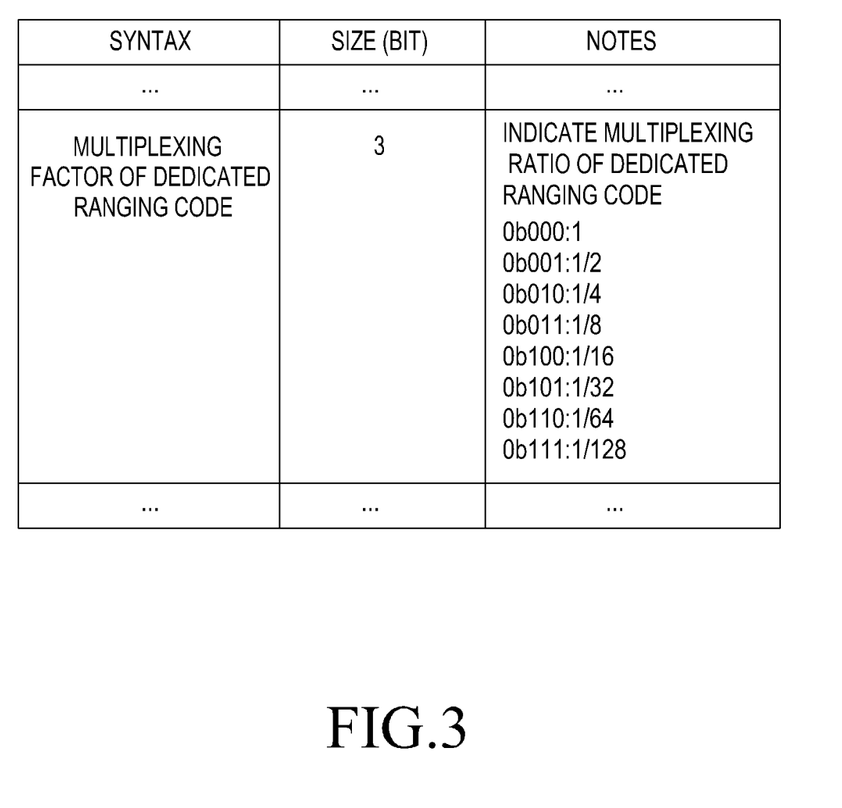
FIG. 3 shows a multiplexing factor according to an exemplary embodiment of the present invention.

FIG. 3 shows a multiplexing factor according to an exemplary embodiment of the present invention.

Referring to FIG. 3, a multiplexing factor may have a size of 3 bits and may be used to indicate a multiplexing ratio of a dedicated ranging code. For example, a value of 0b000 may be used to indicate a multiplexing factor of 1.

It should be noted that, since the determination of the uplink access code and the access channel does not depend on a single M2M terminal, but depends on the M2M terminal group, the uplink access codes and the access channels determined by all the M2M terminals of the same M2M terminal group are the same. After all the M2M terminals of the same M2M terminal group determine the uplink access codes and the access channels, at least one M2M terminal of the M2M terminal group uses the determined access resource to request network access from the base station on behalf of the M2M terminal group. All the members including the M2M terminal which sends the request and M2M terminals which do not send the request from the M2M terminal group sense feedback (e.g., Ranging-ACK) from the base station. In an exemplary implementation, the feedback can be broadcast signaling. When the feedback indicates success, the members of the M2M terminal group access the network according to an existing method. When the feedback indicates continuing access, the group representative of the M2M terminal group continues sending uplink access codes in the determined access channel to the base station. And when the feedback indicates delay, the group representative of the M2M terminal group continues to send uplink access codes to the base station after the delay time is ended.

As can be seen, the base station schedules the M2M terminals in units of M2M terminal groups rather than in units of individual M2M terminals as in the prior art. This can schedule the M2M terminals more simply and quickly and ensure that numerous M2M terminals can successfully access the network and avoid network access congestion.

It should be noted that in the above formulas 1 to 4, $N_{M2M\ group}$ is generated using a Pseudo Random Binary Sequence (PRBS) generator, and its range is from 144 ((H+I+J+K+N+M+L+O+S) mod 256) times to 144 ((H+I+J+K+N+M+L+O+S+$N_{M2M\ group}$) mod 256)−1 times. Thus, $N_{M2M\ group}$ is 256 at most.

Wherein,

N is the number of initial ranging codes, (i.e., N indicates a common initial access uplink ranging code set);

M is the number of periodic ranging codes (i.e., M indicates a common period access uplink ranging code set);

L is the number of Bandwidth Request (BR) codes (i.e., L indicates a common bandwidth request access of the uplink ranging code set);

O is the number of HandOver (HO) ranging codes (i.e., O indicates a common cell handover request access uplink ranging code set);

K is the number of Initial ranging codes in Initial Ranging Code set 1 (i.e., K indicates a common initial access uplink ranging code set 1);

J is the number of BR ranging codes in BR Ranging Code set 1 (i.e., J indicates a common bandwidth request access of the uplink ranging code set 1);

I is the number of HO ranging codes in HO Ranging Code set 1 (i.e., I indicates a common bandwidth request access of the uplink ranging code set 1);

H is the number of HO ranging codes in HO Ranging Code set 2 (i.e., H is a common bandwidth request access of the uplink ranging code set 2);

G is the number of Reed Solomon (RS) initial ranging codes (i.e., G is a relay station common initial access uplink ranging code set);

F is the number of RS dedicated codes (i.e., F is a relay station dedicated access uplink ranging code set).

Figure 4:
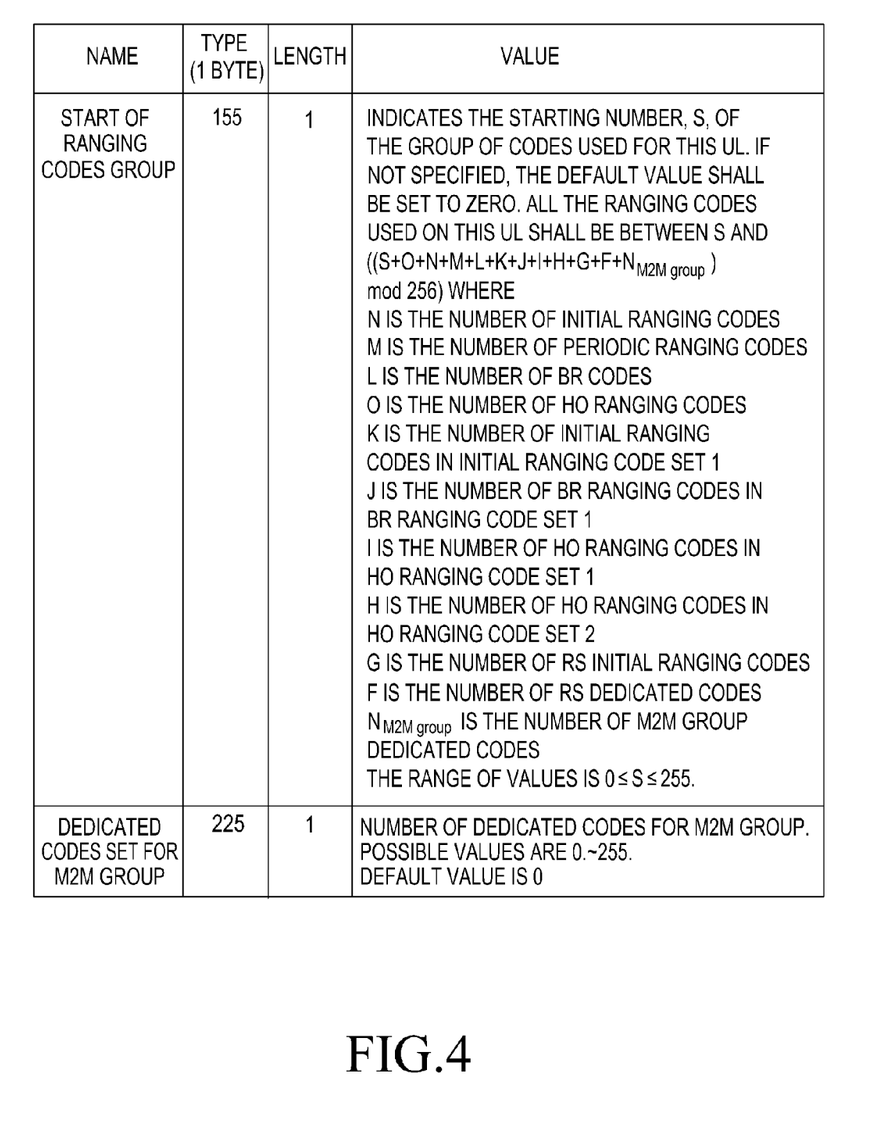
FIG. 4 shows a broadcast message carrying a number of uplink access codes according to an exemplary embodiment of the present invention.

In addition, the $N_{M2M\ group}$ can be published via the base station broadcasting messages such as Uplink Channel Description (UCD) information, and FIG. 4 shows an exemplary method of using a broadcasting message to publish $N_{M2M\ group}$.

FIG. 4 shows a broadcasting message carrying a number of uplink access codes according to an exemplary embodiment of the present invention.

Referring to FIG. 4, a broadcasting message is used to publish $N_{M2M\ group}$. As illustrated, the broadcasting message may include an information element regarding the starting number of the group of codes for a specific UpLink and an information element regarding the number of dedicated codes for the M2M group. As discussed above, the information element regarding the Start of Ranging Code Group indicates the start number S, All the ranging codes used on the Uplink may be between S to ((S+O+N+M+L+K+J+I+H+G+F+$N_{M2Mgoup}$) mod 256).

The above describes an exemplary network access method provided in the present invention based on the concept of an M2M terminal group. In an exemplary implementation, the present invention may further provide a network access method which is not based on the concept of the M2M terminal group. An example of such a method is described below:

A network access method not based on the concept of an M2M terminal group according to an exemplary embodiment of the present invention includes allocating a dedicated initial access channel and a period access channel to the M2M terminal, so that the M2M terminal accesses according to the allocated dedicated initial access channel and period access channel. The allocation of the dedicated initial access channel and the period access channel to the M2M terminal needs to ensure that the initial access channel and the period access channel allocated to the M2M terminal cannot affect the original access channels of the system such as an IEEE 802.16m system. In order to achieve this purpose, it must be ensured that the dedicated initial access channel allocated to the M2M terminal cannot take up a frame with the original access channel of the system. Also, the allocated initial access channel and period access channel should not be allocated in the same frame.

Based on the above constraints, an example is provided based on the commonly used 802.16m system. However, it is to be understood that this is merely for example and the principles and application of the example to other systems are similar.

Initial access channel configurations of the current 802.16m system include the following 4 types:

1. the $O_{SF}$th subframes of each superframe carry an initial access channel;
2. the $O_{SF}$th subframe of the first frame of each superframe carries an initial access channel;
3. the $O_{SF}$th subframe of the first frame of even numbered superframes, i.e., mod(superframe number, 2)=0, carries an initial access channel;
4. the $O_{SF}$th subframe of the first frame in every fourth superframe, i.e., mod(superframe 4)=0, carries an initial access channel.

The four kinds of access channel configurations of the period access channel include the following four types:

1. the $(O_{SF}+1)$th subframes of each superframe carry a period access channel;
2. the $(O_{SF}+1)$th subframe of the second frame of each superframe carries a period access channel;
3. the $(O_{SF}+1)$th subframe of the second frame in every fourth superframe carries a period access channel;
4. the $(O_{SF}+1)$th subframe of the second frame in every eighth superframe, i.e., mod(Superframe number, 8)=0, carries a period access channel.

Based on the above described initial access channel and period access channel of the 802.16m system, in order to achieve network access, when allocating the initial access channel and the period access channel to the M2M terminal, it is necessary to consider that the allocation should not interfere with the above configurations. The following shows an example of allocating an initial access channel and a period access channel to the M2M terminal under the precondition of not interfering with the above configuration. Certain details are provided below.

The following initial access channels are allocated to the M2M terminal.

1. the $(O_{SF}+2)$th subframes of each superframe carry an initial access channel of the M2M terminal;
2. the $(O_{SF}+1)$th subframe of the third frame of each superframe carries an initial access channel of the M2M terminal;
3. the $(O_{SF}+1)$th subframe of the third frame in every even numbered superframe, i.e., mod(superframe number, 2)=0, carries an initial access channel of the M2M terminal;
4. the $(O_{SF}+1)$th subframe of the third frame in every fourth superframe, i.e., mod(superframe number, 4)=0, carries an initial access channel of the M2M terminal The following period access channels are allocated to the M2M terminal:

1. the $(O_{SF}+3)$th subframes of each superframe carry a period access channel of the M2M terminal;
2. the $(O_{SF}+1)$th subframe of the fourth frame of each superframe carries a period access channel of the M2M terminal;
3. the $(O_{SF}+1)$th subframe of the fourth frame in every fourth superframe, i.e., mod(superframe number, 4)=0, carries a period access channel of the M2M terminal;
4. the $(O_{SF}+1)$th subframe of the fourth frame in every eighth superframe, i.e., mod(superframe number, 8)=0, carries a period access channel of the M2M terminal.

Figure 5:
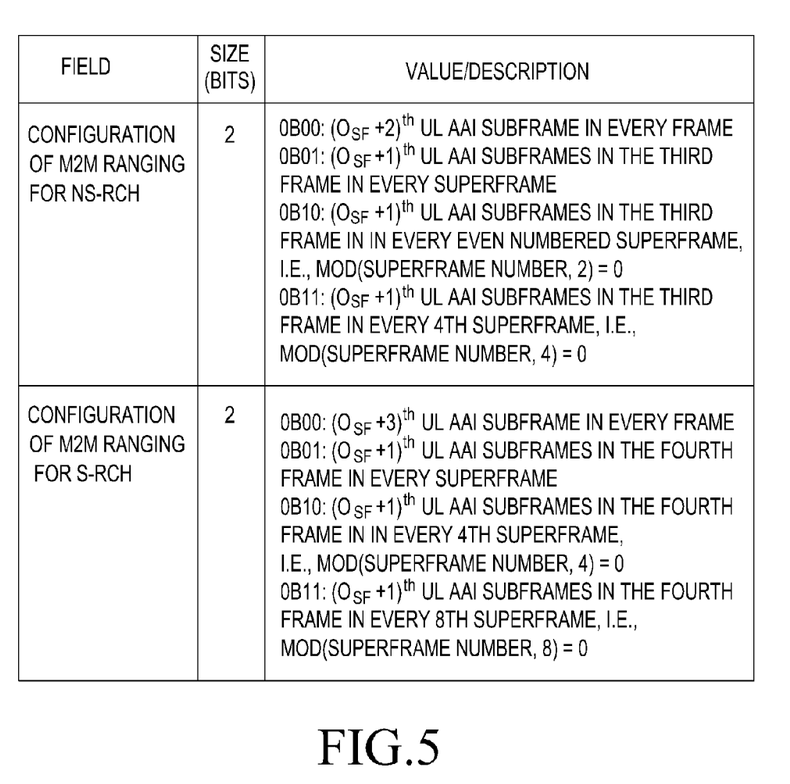
FIG. 5 shows signaling for carrying dedicated access information configured for Machine to Machine (M2M) terminals according to an exemplary embodiment of the present invention.

The above describes the allocation of the initial access channel and the period access channel to the M2M terminal, and certain details of the allocated access channels in the signaling are shown in FIG. 5.

Referring to FIG. 5, signaling comprises fields regarding to configuration of M2M ranging for Non Synchronized Ranging Channel (NS-RCH) and configuration of M2M ranging for Synchronized Ranging Channel (S-RCH).

It should be noted, the above description about the allocation of initial access channel and period access channel to the M2M terminal is only an example, and is not used to limit the present invention, those skilled in the art can make any extension under the precondition that the initial access channel and period access channel allocated to the M2M terminal cannot affect the original access channels, and the present invention will not repeat.

Figure 6:
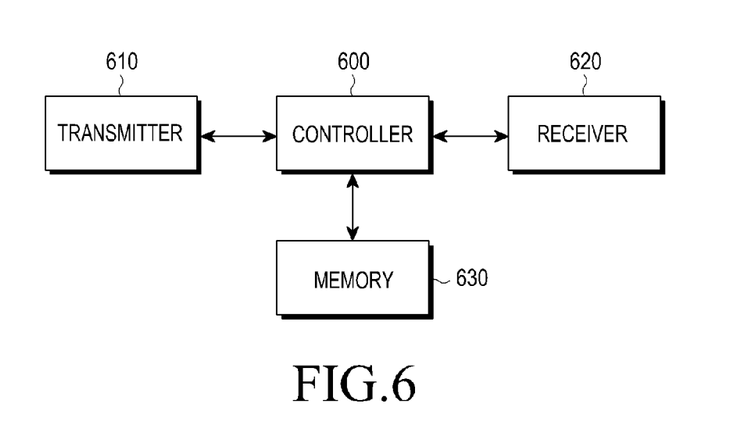
FIG. 6 shows a block diagram of an M2M terminal or a base station according to an exemplary embodiment of the present invention.

FIG. 6 shows a block diagram of an M2M terminal or a base station according to an exemplary embodiment of the present invention.

Referring to FIG. 6, in case of acting as the M2M terminal, a controller 600 determines an access resource comprising an uplink access code and an access channel using an identifier of an M2M terminal group of which the M2M terminal is a member according to the above exemplary embodiments. A memory 630 can store parameters required for determining the access resources and the determined access resource. A transmitter 610 and a receiver 620 facilitate network access under control of the controller 600.

In case of acting as the base station, the receiver 620 receives, from an M2M terminal in a cell under the control of the base station, a request for network access on an access resource determined by using an identifier of an M2M terminal group of which the M2M terminal is a member according to the above exemplary embodiments. The controller 600 sends feedback to the M2M terminal via the transmitter 610 in response to the request for network access, and schedules M2M terminals succeed in its network access in units of M2M terminal group. The memory 630 can store parameters required for communication with the M2M terminals succeed in its network access and the determined access resource.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for accessing a terminal, the method comprising:
   determining, by at least one processor, an access code from an access code set based on an identifier of a terminal group of which the terminal is a member; and accessing, by a transmitter, the network using the determined access code, wherein the access code is determined based on $$r=\mod(\text{floor}(MGID/M), Nm2m\text{group})$$

where, r represents an identifier of an access code, MGID represents an identifier of the terminal group, M represents an access channel, and NM2Mgroup represents a total number of access codes available for the terminal group.

2. The method of claim 1, further comprising:
obtaining the total number of access codes available for the terminal group.

3. The method of claim 2, wherein the determining of the access code comprises:
determining the access code from the access code set based on the identifier of the terminal group and the total number of the access codes.

4. The method of claim 2, wherein the total number of access codes is obtained by using a pseudo random binary sequence (PRBS) generator.

5. The method of claim 2, wherein a maximum value of the total number of access codes is 256.

6. The method of claim 1, further comprising:
obtaining a multiplexing factor of the access code.

7. The method of claim 6, further comprising:
determining the access channel based on the multiplexing factor and a number of identifiers of terminal groups.

8. The method of claim 7, wherein accessing the network comprises:
accessing the network using the determined access code on the determined access channel on behalf of the terminal group.

9. The method of claim 7, wherein the access channel is determined based on $$M=[MGID_{total} \times \alpha / N_{M2Mgroup}]$$

where, M represents the access channel, $MGID_{total}$ represents a number of identifiers of terminal groups, a represents a multiplexing factor of the terminal group, and a $N_{M2M}$ group represents the total number of access codes available for the terminal group.

10. An apparatus of a terminal, the apparatus comprising:
at least one processor configured to determine an access code from an access code set based on an identifier of a terminal group of which the terminal is a member; and
a transmitter configured to access the network using the determined access code, and
wherein the access code is determined based on $$r=\mod(\text{floor}(MGID/M), Nm2m\text{group})$$

where, r represents an identifier of an access code, MGID represents an identifier of the terminal group, M represents an access channel, and NM2Mgroup represents a total number of access codes available for the terminal group.

11. The apparatus of claim 10, wherein the at least one processor is further configured to obtain the total number of access codes available for the terminal group.

12. The apparatus of claim 11, wherein the at least one processor is further configured to determine the access code from the access code set based on the identifier of the terminal group and the total number of the access codes.

13. The apparatus of claim 11, wherein the total number of access codes is obtained by using a pseudo random binary sequence (PRBS) generator.

14. The apparatus of claim 11, wherein a maximum value of the total number of access codes is 256.

15. The apparatus of claim 10, wherein the at least one processor is further configured to obtain a multiplexing factor of the access code.

16. The apparatus of claim 15, wherein the at least one processor is further configured to determine an access channel based on the multiplexing factor and a number of identifiers of terminal groups.

17. The apparatus of claim 12, wherein the transmitter is further configured to access the network using the determined access code on the determined access channel on behalf of the terminal group.

18. The apparatus of claim 16, wherein the access channel is determined based on $$M=[MGID_{total} \times \alpha / N_{M2Mgroup}]$$

where, M represents the access channel, $MGID_{total}$ represents a number of identifiers of terminal groups, a represents a multiplexing factor of the terminal group, and $N_{M2M}$ group represents the total number of access codes available for the terminal group.

19. A method of a base station, the method comprising:
receiving, by a receiver, an access code from a terminal; and
controlling, by at least one processor, a terminal group based upon the received access code,
wherein the access code is determined from an access code set based on an identifier of the terminal group,
wherein the terminal is a member of the terminal group, and
wherein the access code is determined based on $$r=\mod(\text{floor}(MGID/M), N_{m2mgroup})$$

where, r represents an identifier of an access code, MGID represents an identifier of the terminal group, M represents an access channel, and $N_{M2Mgroup}$ represents a total number of access codes available for the terminal group.

20. The method of claim 19, wherein the access code is determined further based on the total number of access codes available for the terminal group.

21. The method of claim 20, wherein the total number of access codes is obtained by using a pseudo random binary sequence (PRBS) generator.

22. The method of claim 20, wherein a maximum value of the total number of access codes is 256.

23. The method of claim 19,
wherein the access code is received on the access channel, and
wherein the access channel is determined based on a multiplexing factor and a number of identifiers of terminal groups.

24. An apparatus of a base station, the apparatus comprising:
a receiver configured to receive an access code from a terminal; and
at least one processor configured to control a terminal group based upon the received access code,
wherein the access code is determined from an access code set based on an identifier of the terminal group,
wherein the terminal is a member of the terminal group, and
wherein the access code is determined based on $$r=\mod(\text{floor}(MGID/M), N_{m2mgroup})$$

where, r represents an identifier of an access code, MGID represents an identifier of the terminal group, M represents an access channel, and $N_{M2Mgroup}$ represents a total number of access codes available for the terminal group.

25. The apparatus of claim 24, wherein the access code is determined further based on the total number of access codes available for the terminal group.

26. The apparatus of claim 25, wherein the total number of access codes is obtained by using a pseudo random binary sequence (PRBS) generator.

27. The apparatus of claim 25, wherein a maximum value of the total number of access codes is 256.

28. The apparatus of claim 24,
wherein the receiver is further configured to receive the access code on the access channel, and
wherein the access channel is determined based on a multiplexing factor and a number of identifiers of terminal groups.

* * * * *